United States Patent
Niwano et al.

(10) Patent No.: US 8,027,698 B2
(45) Date of Patent: Sep. 27, 2011

(54) COMMUNICATION METHOD

(75) Inventors: Kazuhito Niwano, Tokyo (JP); Hideji Wakabayashi, Tokyo (JP); Miho Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 695 days.

(21) Appl. No.: 12/067,187

(22) PCT Filed: Sep. 22, 2005

(86) PCT No.: PCT/JP2005/017479
§ 371 (c)(1),
(2), (4) Date: Mar. 18, 2008

(87) PCT Pub. No.: WO2007/034552
PCT Pub. Date: Mar. 29, 2007

(65) Prior Publication Data
US 2008/0254819 A1 Oct. 16, 2008

(51) Int. Cl.
*H04B 7/00* (2006.01)
(52) U.S. Cl. ....... 455/522; 455/69; 455/13.4; 455/67.11
(58) Field of Classification Search ............... 455/522, 455/69, 510, 126, 127.1, 458, 93, 446, 423, 455/9, 436, 67.11, 562.1, 452.2, 453, 452.1, 455/62, 405, 450, 13.4; 370/347, 329, 337, 370/348, 310, 328, 352, 336, 331, 318, 344, 370/355; 375/260, 295, 298
See application file for complete search history.

(56) References Cited

U.S. PATENT DOCUMENTS

| | | | |
|---|---|---|---|
| 5,933,782 A | 8/1999 | Nakano et al. | |
| 6,490,271 B1 * | 12/2002 | Erjanne | 370/347 |
| 2003/0087641 A1 * | 5/2003 | Gustafsson | 455/446 |
| 2004/0062206 A1 * | 4/2004 | Soong et al. | 370/252 |

(Continued)

FOREIGN PATENT DOCUMENTS

CN 1435013 A 8/2003

(Continued)

OTHER PUBLICATIONS

3GPP TS 25.309 V6.3.0, "3rd Generation Partnership Project; Technical Specification Group Access Network; FDD Enhanced Uplink; Overall Description; Stage 2 (Release 6)", Technical Specification, pp. 1 to 33, 2005.

(Continued)

*Primary Examiner* — Tan Trinh
(74) *Attorney, Agent, or Firm* — Oblon, Spivak, McClelland, Maier & Neustadt, L.L.P.

(57) ABSTRACT

For lack of a unique, specific and detailed specification for information on status of a mobile station to be notified by a mobile station to a fixed station, an operation may be varied from one mobile station to another in a communication system, thereby posing a problem for an efficient uplink scheduling. A communication method includes a transmission process multiplexing a transport channel for transmitting data from a high-order layer on a physical data channel and transmitting the multiplexed result to the fixed station, a status notification process notifying status information containing information on a transmission power headroom used for scheduling, and a transmission control process receiving the scheduling result and controlling the transmission process. The status information notification process includes notifying an index attached to each predetermined transmission power headroom level classified between upper and lower limit values of the transmission power headroom as the status information.

2 Claims, 15 Drawing Sheets

U.S. PATENT DOCUMENTS

| | | | |
|---|---|---|---|
| 2004/0147276 A1* | 7/2004 | Gholmieh et al. | 455/522 |
| 2005/0003824 A1* | 1/2005 | Siris | 455/452.1 |
| 2005/0025077 A1* | 2/2005 | Balasubramanian et al. | 370/310 |
| 2005/0181832 A1* | 8/2005 | Ishii et al. | 455/562.1 |
| 2006/0057978 A1* | 3/2006 | Love et al. | 455/127.1 |
| 2006/0280145 A1* | 12/2006 | Revel et al. | 370/331 |
| 2009/0017836 A1* | 1/2009 | Lee | 455/452.2 |

FOREIGN PATENT DOCUMENTS

| | | |
|---|---|---|
| CN | 1521956 A | 8/2004 |
| EP | 1 437 912 A1 | 7/2004 |
| EP | 1 503 545 A2 | 2/2005 |
| JP | 8 167872 | 6/1996 |
| JP | 10-112683 | 4/1998 |
| JP | 2003-518812 | 6/2003 |
| JP | 2004 215276 | 7/2004 |
| WO | 01 47146 | 6/2001 |
| WO | WO 2005/078967 A1 | 8/2005 |

OTHER PUBLICATIONS

U.S. Appl. No. 12/839,030, filed Jul. 19, 2010, Wakabayashi, et al.

Chinese Office Action issued Nov. 2, 2010, in Patent Application No. 200580051659.9 (with English-language translation).

* cited by examiner

F I G . 4

| SI SIGNALLING INFORMATION | TRANSMISSION POWER HEADROOM VALUE (a) |
|---|---|
| (Reserved) | (Reserved) |
| 0 | $0 \leqq a < 1$ [ dB ] |
| 1 | $1 \leqq a < 2$ [ dB ] |
| 2 | $2 \leqq a < 3$ [ dB ] |
| 3 | $3 \leqq a < 4$ [ dB ] |
| ⋮ | ⋮ |
| ⋮ | ⋮ |
| ⋮ | ⋮ |
| $2^4 - 1$ (or $2^5 - 1$) | X [dB] OR MORE |

F I G. 5
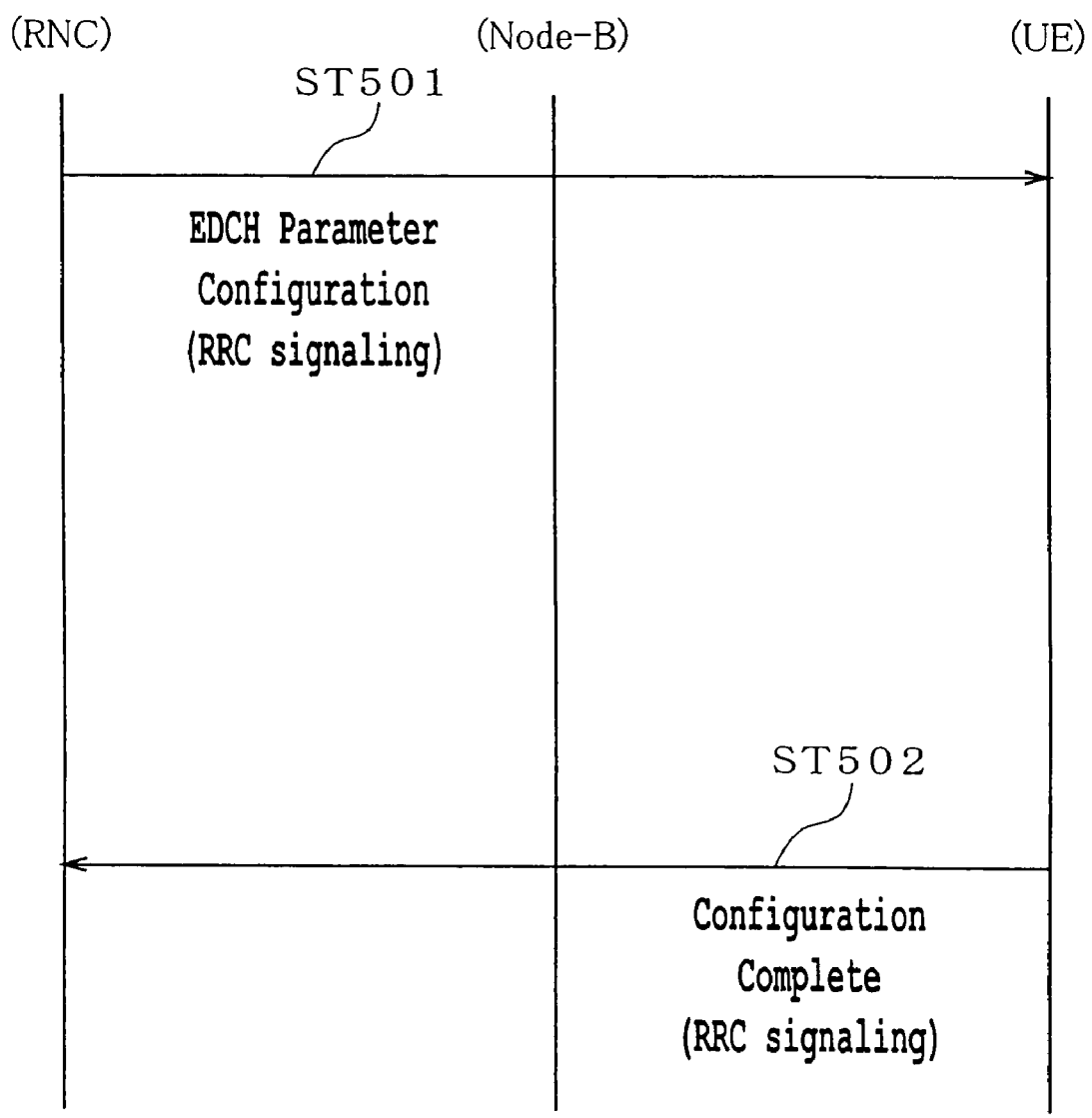

F I G . 6

| SI SIGNALLING INFORMATION | TRANSMISSION POWER HEADROOM VALUE (a) |
|---|---|
| (Reserved) | (Reserved) |
| 0 | $0 \leq a < 1$ [ d B ] |
| 1 | $1 \leq a < 2$ [ d B ] |
| 2 | $2 \leq a < 3$ [ d B ] |
| 3 | $3 \leq a < 4$ [ d B ] |
| ⋮ | ⋮ |
| ⋮ | ⋮ |
| ⋮ | ⋮ |
| $2^4 - 1$ (or $2^5 - 1$) | 2 1 [ d B ] OR MORE |

FIG. 7

| Signalling values for $\Delta_{E\text{-}DPDCH}$ | Quantized amplitude ratios for $10^{\left(\frac{\Delta_{E\text{-}DPDCH}}{20}\right)}$ |
|---|---|
| 29 | 168/15 |
| 28 | 150/15 |
| 27 | 134/15 |
| 26 | 119/15 |
| 25 | 106/15 |
| 24 | 95/15 |
| 23 | 84/15 |
| 22 | 75/15 |
| 21 | 67/15 |
| 20 | 60/15 |
| 19 | 53/15 |
| 18 | 47/15 |
| 17 | 42/15 |
| 16 | 38/15 |
| 15 | 34/15 |
| 14 | 30/15 |
| 13 | 27/15 |
| 12 | 24/15 |
| 11 | 21/15 |
| 10 | 19/15 |
| 9 | 17/15 |
| 8 | 15/15 |
| 7 | 13/15 |
| 6 | 12/15 |
| 5 | 11/15 |
| 4 | 9/15 |
| 3 | 8/15 |
| 2 | 7/15 |
| 1 | 6/15 |
| 0 | 5/15 |

FIG. 8

| SI SIGNALLING INFORMATION | TRANSMISSION POWER HEADROOM VALUE |
|---|---|
| (Reserved) | (Reserved) |
| 0 | 0 [dB] |
| 1 | 1 [dB] |
| 2 | 2 [dB] |
| 3 | 3 [dB] |
| : | : |
| : | : |
| : | 21 [dB] |
| $2^4-1$ (or $2^5-1$) | MORE THAN 21 [dB] |

F I G . 9

| SI SIGNALLING INFORMATION | TRANSMISSION POWER HEADROOM VALUE |
|---|---|
| (Reserved) | (Reserved) |
| 0 | 0 [ d B ] |
| 1 | 1 [ d B ] |
| 2 | 2 [ d B ] |
| 3 | 3 [ d B ] |
| : | : |
| : | : |
| : | 2 1 [ d B ] |
| $2^4-1$ (or $2^5-1$) | MAXIMUM RATIO (MAXIMUM VALUE) [dB] OR MORE |

F I G . 1 0

| SI SIGNALLING INFORMATION | TRANSMISSION POWER HEADROOM VALUE |
|---|---|
| (Reserved) | (Reserved) |
| 0 | 0 [ d B ] |
| 1 | 1 [ d B ] |
| 2 | 2 [ d B ] |
| 3 | 3 [ d B ] |
| : | : |
| : | : |
| : | 2 1 [ d B ] |
| $2^4 - 1$ (or $2^5 - 1$) | OUT OF RANGE |

FIG. 11

| SI SIGNALLING INFORMATION | TRANSMISSION POWER HEADROOM VALUE |
|---|---|
| (Reserved) | (Reserved) |
| 0 | $-10\,[\text{dB}]$ |
| 1 | : |
| 2 | $0\,[\text{dB}]$ |
| 3 | $1\,[\text{dB}]$ |
| : | $2\,[\text{dB}]$ |
| : | $3\,[\text{dB}]$ |
| : | : |
| $2^4-1\,(\text{or}\ 2^5-1)$ | $21\,[\text{dB}]$ |

F I G . 1 2

| SI SIGNALLING INFORMATION | TRANSMISSION POWER HEADROOM VALUE(dB) | Signalling values for $\Delta_{E\text{-}DPDCH}$ | Quantized amplitude ratios for $10^{\left(\frac{\Delta_{E\text{-}DPDCH}}{20}\right)}$ |
|---|---|---|---|
| (Reserved) | (Reserved) | (Reserved) | (Reserved) |
| 29 | 20.98 | 29 | 168/15 |
| 28 | 20.00 | 28 | 150/15 |
| 27 | 19.02 | 27 | 134/15 |
| 26 | 17.99 | 26 | 119/15 |
| 25 | 16.98 | 25 | 106/15 |
| 24 | 16.03 | 24 | 95/15 |
| 23 | 14.96 | 23 | 84/15 |
| 22 | 13.98 | 22 | 75/15 |
| 21 | 13.00 | 21 | 67/15 |
| 20 | 12.04 | 20 | 60/15 |
| 19 | 10.96 | 19 | 53/15 |
| 18 | 9.92 | 18 | 47/15 |
| 17 | 8.94 | 17 | 42/15 |
| 16 | 8.07 | 16 | 38/15 |
| 15 | 7.11 | 15 | 34/15 |
| 14 | 6.02 | 14 | 30/15 |
| 13 | 5.10 | 13 | 27/15 |
| 12 | 4.08 | 12 | 24/15 |
| 11 | 2.92 | 11 | 21/15 |
| 10 | 2.05 | 10 | 19/15 |
| 9 | 1.09 | 9 | 17/15 |
| 8 | 0 | 8 | 15/15 |
| 7 | −1.24 | 7 | 13/15 |
| 6 | −1.94 | 6 | 12/15 |
| 5 | −2.69 | 5 | 11/15 |
| 4 | −4.44 | 4 | 9/15 |
| 3 | −5.46 | 3 | 8/15 |
| 2 | −6.62 | 2 | 7/15 |
| 1 | −7.96 | 1 | 6/15 |
| 0 | −9.54 | 0 | 5/15 |

FIG. 13

| SI SIGNALLING INFORMATION | TRANSMISSION POWER HEADROOM VALUE | Signalling values for $\Delta_{\text{E-DPDCH}}$ | Quantized amplitude ratios for $10^{\left(\frac{\Delta_{E\text{-}DPDCH}}{20}\right)}$ |
|---|---|---|---|
| (Reserved) | (Reserved) | (Reserved) | (Reserved) |
| 29 | 21 | 29 | 168/15 |
| 28 | 20 | 28 | 150/15 |
| 27 | 19 | 27 | 134/15 |
| 26 | 18 | 26 | 119/15 |
| 25 | 17 | 25 | 106/15 |
| 24 | 16 | 24 | 95/15 |
| 23 | 15 | 23 | 84/15 |
| 22 | 14 | 22 | 75/15 |
| 21 | 13 | 21 | 67/15 |
| 20 | 12 | 20 | 60/15 |
| 19 | 11 | 19 | 53/15 |
| 18 | 10 | 18 | 47/15 |
| 17 | 9 | 17 | 42/15 |
| 16 | 8 | 16 | 38/15 |
| 15 | 7 | 15 | 34/15 |
| 14 | 6 | 14 | 30/15 |
| 13 | 5 | 13 | 27/15 |
| 12 | 4 | 12 | 24/15 |
| 11 | 3 | 11 | 21/15 |
| 10 | 2 | 10 | 19/15 |
| 9 | 1 | 9 | 17/15 |
| 8 | 0 | 8 | 15/15 |
| 7 | −1 | 7 | 13/15 |
| 6 | −2 | 6 | 12/15 |
| 5 | −3 | 5 | 11/15 |
| 4 | −4 | 4 | 9/15 |
| 3 | −5 | 3 | 8/15 |
| 2 | −7 | 2 | 7/15 |
| 1 | −8 | 1 | 6/15 |
| 0 | −10 | 0 | 5/15 |

F I G . 1 4

| SI SIGNALLING INFORMATION | E-TFC | TRANSMISSION POWER HEADROOM VALUE |
|---|---|---|
| (Reserved) | (Reserved) | (Reserved) |
| 0 | E-TFC1 | X [dB] OR LESS (OR LESS THAN X [dB]) |
| : | : | : |
| 4 | E-TFC 4 | 0 [ d B ] |
| 5 | E-TFC 5 | 1 [ d B ] |
| : | : | : |
| : | : | : |
| : | : | : |
| $2^4-1$ (or $2^5-1$) | E-TFC, max | 2 1 [ d B ] OR MORE |

FIG. 15

| SI SIGNALLING INFORMATION | TRANSMISSION POWER HEADROOM VALUE (TRUE VALUE) |
|---|---|
| (Reserved) | (Reserved) |
| 32 | $(168/15)^2 * 4$ |
| 31 | $(168/15)^2 * 3$ |
| 30 | $(168/15)^2 * 2$ |
| 29 | $(168/15)^2$ |
| 28 | $(150/15)^2$ |
| 27 | $(134/15)^2$ |
| 26 | $(119/15)^2$ |
| 25 | $(106/15)^2$ |
| 24 | $(95/15)^2$ |
| 23 | $(84/15)^2$ |
| 22 | $(75/15)^2$ |
| 21 | $(67/15)^2$ |
| 20 | $(60/15)^2$ |
| 19 | $(53/15)^2$ |
| 18 | $(47/15)^2$ |
| 17 | $(42/15)^2$ |
| 16 | $(38/15)^2$ |
| 15 | $(34/15)^2$ |
| 14 | $(30/15)^2$ |
| 13 | $(27/15)^2$ |
| 12 | $(24/15)^2$ |
| 11 | $(21/15)^2$ |
| 10 | $(19/15)^2$ |
| 9 | $(17/15)^2$ |
| 8 | $(15/15)^2$ |
| 7 | $(13/15)^2$ |
| 6 | $(12/15)^2$ |
| 5 | $(11/15)^2$ |
| 4 | $(9/15)^2$ |
| 3 | $(8/15)^2$ |
| 2 | $(7/15)^2$ |
| 1 | $(6/15)^2$ |
| 0 | $(5/15)^2$ |

COMMUNICATION METHOD

TECHNICAL FIELD

This invention relates to a mobile station, a fixed station and a communication method implemented in a communication system using the CDMA (Code Division Multiple Access) scheme, and in particular, to a communication method implemented in a mobile communication system having set therein a channel for transmitting uplink high-speed packet data.

BACKGROUND ART

In recent years, a plurality of communication standards referred to as the third generation for a high-speed CDMA mobile unit communication system have been employed as IMT-2000 by the International Telecommunication Union (ITU), and as one of them, the commercial service of W-CDMA (FDD: Frequency Division Duplex) has been started in Japan in 2001. The first specification of the W-CDMA scheme was determined as Release 1999 (Version name: 3.x.x) edited in 1999 by the standardization organization 3GPP (3rd Generation Partnership Project). Currently, Release 4 and Release 5 have been specified as a new version of Release 1999. At the same time, Release 6 is under study and in the process of preparation.

Release 1999 has been prepared by assuming mainly continuous data transmission and reception such as verbal communication. In Release 5, the HSDPA (High Speed Downlink Packet Access) technique is added to enable downlink high-speed packet communication, while the uplink uses Release 1999 specification as it is. Even in the case where packet data is transmitted in burst from a mobile station to a fixed station, therefore, an individual dedicated channel (DCH (Dedicated CHannel) and DPDCH (Dedicated Physical Data CHannel) are required to be constantly assigned to each mobile station. Considering the current situation in which demand for packet data transmission such as voice packet transmission has increased, however, a problem has been posed from the viewpoint of effective utilization of radio resources.

Also, the data transmission from a mobile station is conducted under an autonomous transmission control of the mobile station. In this case, the transmission timing from each mobile station is arbitrary (or statistically at random). In a data transmission system with the transmission controlled autonomously by each mobile station, the transmission timing at the mobile station is unknown to the fixed station. In the communication system using the CDMA communication scheme, transmission from other mobile stations all constitute an interference source. In the fixed station managing radio resources, however, an interference noise amount and a change amount thereof can be predicted (managed) only statistically in the reception at a base station. As described above, in the communication system using the CDMA communication scheme, the fixed station managing radio resources is neither informed of transmission timing of mobile stations nor capable of accurately predicting interference noise amounts. The radio resources are assigned in such a manner as to secure a sufficient margin, therefore, in preparation for a case with a large change amount of interference noise. This radio resource management by the fixed station is carried out not by the base station itself but by a base station control unit (RNC: Radio Network Controller) on behalf of a plurality of base stations.

The radio resource management and incidental notifications from the base station control unit (RNC) to mobile stations require a comparatively long processing time (the order of several hundred milliseconds). The radio resources cannot be properly assigned, therefore, in keeping with a sudden change in the radio propagation environment, transmission situation of other mobile stations (interference amounts from other mobile stations), or the like. In view of this, with the aim of realizing effective utilization of radio resources and high-speed radio resource assignment, the E-DCH (Enhanced DCH) technique with a detailed specification has been introduced in Release 6. The E-DCH technique is sometimes referred to as HSUPA (High Speed Uplink Packet Access). In the E-DCH technique, a short transmission time interval (TTI) can be used together with the AMC (Adaptive Modulation and Coding) technique and the HARQ (Hybrid Automatic Repeat reQuest) technique used in the HSDPA (High Speed Downlink Packet Access) technique introduced in Release 5. E-DCH is defined as a transport channel expanded from DCH constituting a transport channel according to the conventional standard, and set independently of DCH.

According to E-DCH, uplink radio resource control operation referred to as "scheduling" is performed on the part of the fixed station. The uplink and the downlink have different radio wave propagation environments and the like, and hence are different in scheduling from HSDPA. The mobile station controls packet data transmission based on the scheduling result notified from the fixed station. The fixed station transmits a receiving determination result (ACK/NACK) for the received packet data to the mobile station. According to 3GPP, the base station (referred to as NodeB in 3GPP) is specified as a device for carrying out the scheduling of the fixed station. A specific example of the E-DCH scheduling method in the base station is disclosed in, for example, Japanese Patent Publication No. 2004-215276 (Patent Document 1).

Also, TS25.309v6.3.0 (Non-Patent Document 1) is available as a 3GPP standard (TS: Technical specification) prepared for E-DCH.

Patent Document 1: Japanese Patent Publication No. 2004-215276

Non-Patent Document 1: 3rd Generation Partnership Project, Technical Specification Group Radio Access Network; FDD Enhanced Uplink; Overall description; Stage 2 (Release 6), 3GPP TS 25.309V6.3.0 (2005-06).

Main channels relating to the specification of Release 6 are briefly described below. As uplink physical channels for E-DCH, Release 6 has added thereto E-DPDCH (Enhanced-Dedicated Physical Data CHannel) constituting a data channel and E-DPCCH (Enhanced-Dedicated Physical Control CHannel) constituting a control channel. E-DPDCH and E-DPCCH are physical channels corresponding to DPDCH and DPCCH, respectively, constituting physical channels before Release 5, in which E-DPDCH is used for data transmission from a high-order layer and E-DPCCH for transmission of control information. Also, as in the DPDCH communication speed setting (referred to as TFC (Transport Format Combination) according to 3GPP), E-TFC (Enhanced-TFC) is provided for specifying communication speed for E-DCH transmission. A gain factor ($\beta$ed) specifying an E-DPDCH channel amplitude is determined based on the communication speed. Also, as downlink physical channels for E-DCH, Release 6 has added thereto both E-AGCH (Enhanced-Absolute Grant CHannel) and E-RGCH (Enhanced-Relative Grant CHannel) for notifying scheduling results, and E-HICH (E-DCH HARQ Acknowledgment Indicator Channel) for notifying packet data receiving determination results (ACK/NACK).

In data transmission from the mobile station, E-DCH and DCH are each handled as an independent data stream, and the DCH transmission is given priority to the E-DCH transmission. Since E-DCH and DCH are independent data streams and the DCH transmission is given priority over the E-DCH transmission, the mobile station secures transmission power required for DCH transmission and the E-DCH transmission is carried out by selecting E-TFC in a remaining margin of the transmission power as described in Non-Patent Document 1.

SUMMARY OF THE INVENTION

Problems of the uplink transmission control operation posed by adding E-DCH is described below. The scheduler of the base station intending to carry out the uplink scheduling is required to know the state of the mobile station. Non-Patent Document 1 described above defines two methods for the scheduler of the base station to know the state of the mobile station. One is to use SI (Scheduling Information) whereby the untransmitted amount information on high-order layer data stored in the transmission data buffer and the headroom information of the transmission power of the mobile station can be notified from the mobile station over E-DPDCH together with the high-order layer data. Periodical SI notification or SI notification as an event trigger is under study. The other method is to use happy bits notified over E-DPCCH as one-bit information as determined from the untransmitted data amount stored in the buffer and the headroom quantity of the transmission power of the mobile station. For lack of a unique, specific and detailed specification, however, a problem is posed that the operation may be varied from one mobile station to another in the communication system and the uplink scheduling (radio resource assignment) cannot be carried out efficiently.

The object of the present invention is to solve the problem posed by adding E-DCH and to provide a communication method for properly carrying out the uplink transmission control and the radio resource control operation.

According to the present invention, there is provided a mobile station in which a scheduling result including transmission speed information, transmission power information and a channel amplitude coefficient is received from a fixed station and a transport channel for transferring data from a high-order layer is multiplexed on a physical data channel and transmitted to the fixed station, wherein an index attached to each level of a predetermined transmission power headroom classified between upper and lower limit values of the transmission power headroom is notified as status information including information on the transmission power headroom used for scheduling.

A communication method according to the present invention includes a first step for sending from a mobile station to a base station, mobile station transmission power headroom information reflecting headroom quantity of transmission power in the mobile station, a second step for indicating uplink radio resources from the base station to the mobile station on a basis of the mobile transmission power headroom information, and a third step for sending data from the mobile station to the base station according to the indication of the uplink radio resources by the base station, wherein in the first step as the mobile station transmission power headroom information, a first signaled value is sent reflecting that mobile station transmission power contains a closed section having a predetatermined lower limit quantity and a predetermined upper limit quantity, and a second signaled value is sent reflecting that the mobile station transmission power contains a half opened section having a predetermined lower limit quantity and not having an upper limit quantity.

In the communication method according to the present invention, the operation in the mobile station of the communication system is unified and the efficiency of the uplink radio resource control in the fixed station is improved.

BRIEF DESCRIPTION OF THE DRAWINGS

FIG. 4 is a diagram showing an example of specifying headroom information of transmission power of the mobile station transmitted to the base station as SI (Scheduling Information) according to the first embodiment of the present invention.

FIG. 5 is a diagram showing a flow of notifying (RRC_signalling) a set value of a parameter (X) in FIG. 4 according to the first embodiment of the present invention.

FIG. 6 is a diagram showing an example of a case in which an X value is set as a fixed value in a written standard as a modification of the specification in FIG. 4 according to the first embodiment of the present invention.

FIG. 7 is a diagram showing a table of setting specifications and notification information (signalling value) of a quantized E-DPDCH channel amplitude coefficient ($\beta$ed) specified in a known written standard (specified from the value of power offset amount ($\Delta$E-DPDCH)).

FIG. 8 is a diagram showing an example of specifying headroom information of transmission power of the mobile station transmitted to the base station as SI (Scheduling Information) according to a second embodiment of the present invention.

FIG. 9 is a diagram showing an example of specifying headroom information of transmission power of the mobile station transmitted to the base station as SI (Scheduling Information) according to a third embodiment of the present invention.

FIG. 10 is a diagram showing an example of specifying headroom information of transmission power of the mobile station transmitted to the base station as SI (Scheduling Information) according to a fourth embodiment of the present invention.

FIG. 11 is a diagram showing an example of specifying headroom information of transmission power of the mobile station transmitted to the base station as SI (Scheduling Information) according to a fifth embodiment of the present invention.

FIG. 12 is a diagram showing an example of specifying headroom information of transmission power of the mobile station transmitted to the base station as SI (Scheduling Information) according to a sixth embodiment of the present invention.

FIG. 13 is a diagram showing an example of specifying headroom information of transmission power of the mobile station transmitted to the base station as SI (Scheduling Information) according to a modification of the sixth embodiment of the present invention.

FIG. 14 is a diagram showing an example of specifying headroom information of transmission power of the mobile station transmitted to the base station as SI (Scheduling Information) according to a seventh embodiment of the present invention.

FIG. 15 is a diagram showing an example of specifying headroom information of transmission power of the mobile station transmitted to the base station as SI (Scheduling Information) according to a ninth embodiment of the present invention.

Figure 1:
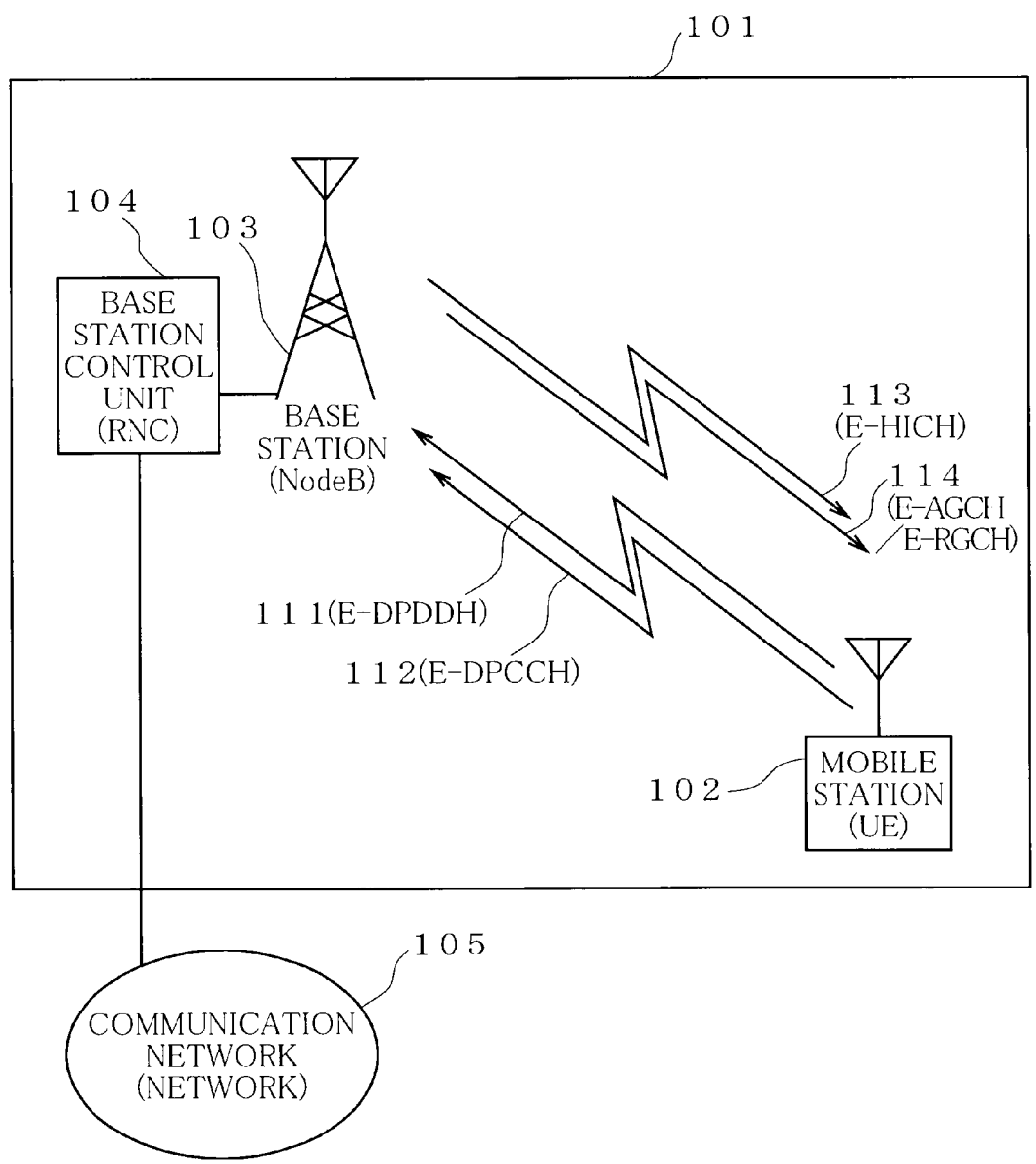
FIG. 1 is a block diagram showing a configuration of a radio communication system according to a first embodiment of the present invention.

DESCRIPTION OF REFERENCE NUMERALS 101 radio communication system, 102 mobile station, 103 base station, 104 base station control unit, 105 communication network, 201 radio resource control unit, 202 media access unit (MAC unit), 203 MAC transmission unit, 204 MAC control unit, 205 modulation unit, 206 transmission unit, 207 antenna, 208 transmission power measurement control unit, 209 receiving unit, 210 demodulation unit, 211 MAC receiving unit, 301 radio resource control unit, 302 media access unit (MAC unit), 303 MAC transmission unit, 304 MAC scheduler unit, 305 modulation unit, 306 transmission unit, 307 antenna, 309 receiving unit, 310 demodulation unit, 311 MAC receiving unit

BEST MODE FOR CARRYING OUT THE INVENTION

Embodiment 1

A first embodiment of the present invention is described with reference to the drawings. First, the configuration of each part of a communication system is described with reference to FIGS. 1 to 3. FIG. 1 is a diagram schematically showing the configuration of a radio communication system according to the first embodiment of the present invention. In FIG. 1, a radio communication system 101 is configured of a mobile station 102, a base station 103 and a base station control unit 104. The base station 103 covers a specific communication range (generally referred to as a sector or a cell) and communicates with a plurality of mobile stations 102. In FIG. 1, only one mobile station 102 is shown for convenience' sake. Communication between the mobile station 102 and the base station 103 is performed using one or a plurality of radio links (or channels). The base station control unit 104 communicates with a plurality of base stations 103 and connected with an external communication network 105 such as a public telephone network or the Internet, relays packet communication between the base station 103 and the network 105. In FIG. 1, only one base station 103 is shown for convenience' sake. According to the W-CDMA standard, the mobile station 102 is referred to as UE (User Equipment), the base station 103 NodeB and the base station control unit 104 RNC (Radio Network Controller).

Channels (such as DCH or DPDCH) prior to Release 5 are known and therefore not illustrated or described in detail. Uplink E-DPDCH 111 and E-DPCCH 112 are physical channels for E-DCH transmission. Basically, E-DPDCH 111 and E-DPCCH 112 are transmitted in pair, and therefore, the following description is centered on the E-DPDCH, while the E-DPCCH is also referred to as required. A downlink E-HICH 113 is a channel for notifying E-DCH data receiving determination results (ACK/NACK) at the base station 103 to the mobile station 102. A downlink E-AGCH/E-RGCH 114, on the other hand, is a channel for notifying scheduling results for E-DCH. The scheduling result is expressed in the form of speed information (for example, E-TFC or maximum transmission speed set value), power information (maximum transmission power or a ratio of the maximum transmission power) or channel amplitude information (a channel amplitude coefficient or a ratio of the channel amplitude coefficient). According to Non-Patent Document 1, the scheduling result is notified in the form of a ratio of channel transmission power of the E-DPDCH to that of the DPCCH and information on increase/decrease of the power ratio.

Figure 2:
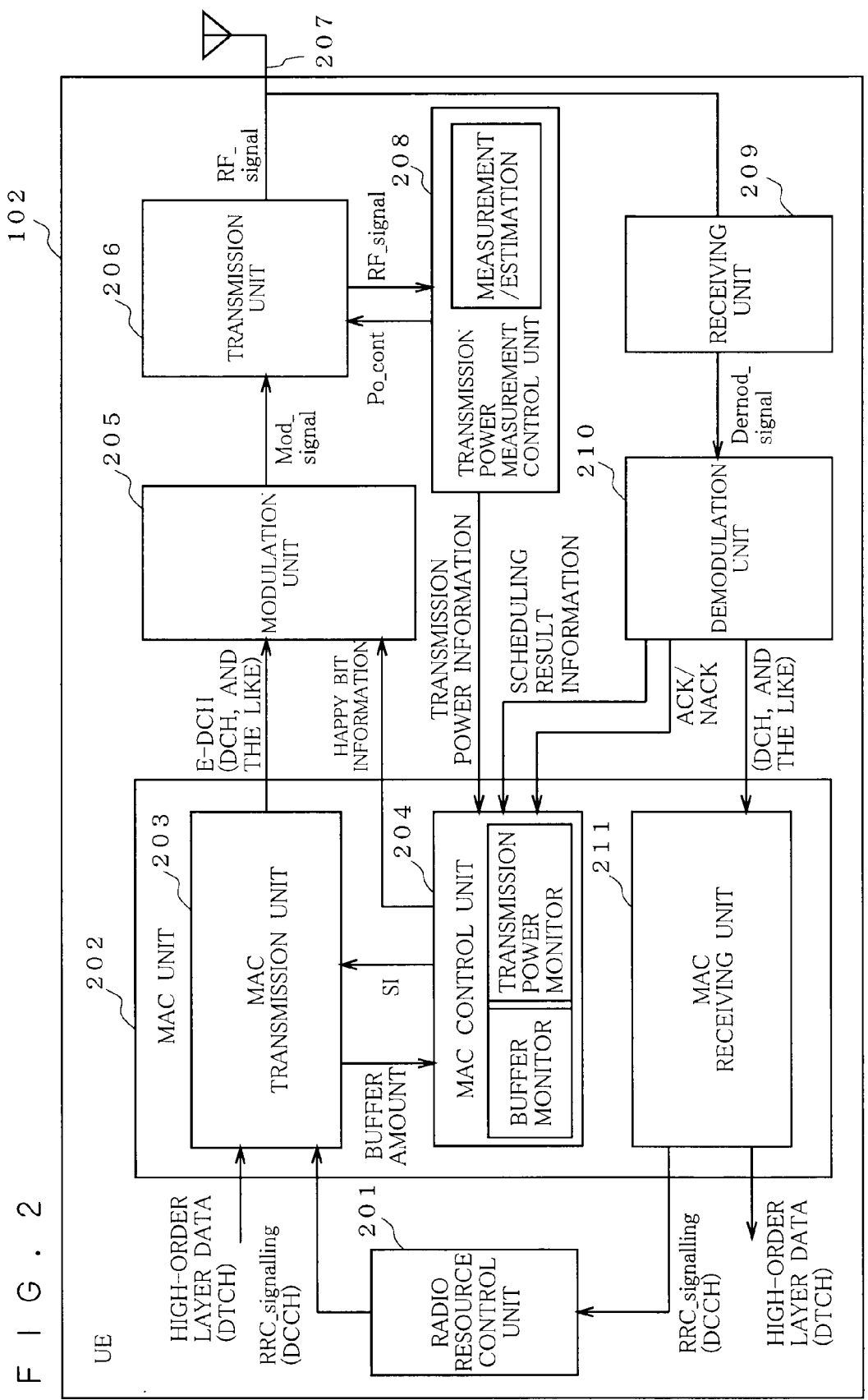
FIG. 2 is a block diagram showing a configuration of a mobile station according to the first embodiment of the present invention.

FIG. 2 is a block diagram showing the configuration of a mobile station according to the first embodiment of the present invention. With reference to FIG. 2, the internal structure of the mobile station (function blocks, and a flow of data and a control signal) is described below. A radio resource control unit 201 controls each part in the mobile station for various communication setting including transmission speeds and combinations of channels required for the communication with the fixed station. Also, the radio resource control unit 201 inputs/outputs information of the various setting. Part of the various setting information is exchanged (referred to as RRC signalling in the W-CDMA) between the fixed station (the base station control unit 104/base station 103) and the mobile station 102 in an initial stage or the middle of the communication and stored in the radio resource control unit 201. The transmission information (RRC signalling) of the radio resource control unit to the fixed station is transmitted as data carried on the E-DPDCH or a channel such as a DCH (DPDCH as a physical channel, not shown) or a RACH (PRACH as a physical channel, not shown) prior to Release 5. According to the present embodiment, although not specifically limited, the operation in the middle of the communication is described with data carried on the DCH (DPDCH) for convenience' sake.

A MAC unit 202 executes a process in a MAC (Media Access Control) layer. Specifically, a MAC transmission unit 203 is supplied with an input including transmission data (DTCH) from a high-order protocol layer and control information (DCCH) from the radio resource control unit 201 and outputs the same as E-DCH (or DCH, or the like.). Also, the MAC transmission unit 203 measures a data amount not yet transmitted on a specific transmission data buffer or all the transmission data buffers (not shown) in the mobile station designated by the fixed station, and outputs the data amount as buffer information to a MAC control unit 204. A transmission buffer of which the data amount is measured is notified as setting information (RRC signalling). Also, the MAC transmission unit 203 is supplied, as an input from the MAC control unit 204, with data of mobile station status information (SI: Scheduling Information) to be transmitted to the base station 103, and outputs the same as part of E-DCH (or separate inter-protocol layer notification information (not shown)). The DTCH and DCCH data can be sent in various channels such as the DCH or the RACH (not shown) prior to Release 5, and a combination setting is specified in the written standard. The MAC control unit 204 has a buffer monitor function and a transmission power monitor function therein. The MAC control unit 204 is supplied with an input including (1) buffer information from the MAC transmission unit 203, (2) transmission power information from a transmission power measurement control unit 208 to be described later, and (3) scheduling result information from a demodulation unit 210 to be described later received from the base station, thereby controlling the E-DCH transmission. The MAC control unit 204 determines SI data and happy bit information as the mobile station status information from the buffer information and the transmission power information inputted thereto, and outputs them to each of the MAC transmission unit 203 and a modulation unit 205 for transmission to the base station. A headroom quantity of the mobile station transmission power transmitted as SI is estimated as a difference between (1) a value of the total transmission power of the mobile station indicated by the transmission power information from the transmission power measurement control unit 208 and (2) a maximum total transmission power value (hereinafter described as Pmax) determined from transmission channel setting, each channel amplitude parameter, and the like, so that a direct numerical value, an index corresponding to the numerical value, or the like is notified (by signalling). Specific examples include (1) a ratio between "the maximum total transmission power (Pmax)" and "the total power of DPCCH, DPDCH and HS-DPCCH (not shown)) and (2) a ratio between "the maximum total transmission power (Pmax)" and "the total DPCCH power". The Pmax is determined by the channel setting and the mobile station capability and may be specified by a backoff amount from the mobile station capability.

In the modulation unit 205, the E-DCH data and the SI data inputted are carried on the uplink E-DPDCH 111 and the happy bit information on the E-DPCCH, and then, multiplexed with another physical channel by a known technique such as so-called IQ multiplexing. Further, the multiplexed channel is subjected to a spread spectrum modulation process by a known technique thereby to output a modulation signal (Mod_signal). The modulation unit 204 makes up a multiplex modulation means. A transmission unit 206, after converting the inputted modulation signal (Mod_signal) into a radio frequency signal by a known technique, amplifies it to a required transmission power level and outputs a radio signal (RF_signal). The radio signal (RF_signal) is transmitted wirelessly from an antenna 207, while at the same time being transmitted as a branch output to the transmission power measurement control unit 208. Also, the transmission unit 206 adjusts the transmission power of the radio signal (RF_signal) in accordance with transmission power control information (Po_cont) from the transmission power measurement control unit 208.

The transmission power measurement control unit 208 controls the transmission power and outputs the control information (Po_cont) to the transmission unit 206. Also, the transmission power measurement control unit 208 has therein a transmission power measurement (estimation) function to estimate the transmission power of each channel or the total transmission power. From the radio signal (RF_signal) outputted from the transmission unit 206, average power for a predetermined time period (defined as 1 frame, 1 TTI or 1 slot for the W-CDMA) is measured (or estimated) and transmission power information is outputted to the MAC control unit 204. The transmission unit 206, the antenna 207 and the transmission power measurement control unit 208 described above make up a transmission means.

The receiving unit 209, supplied with a downlink radio signal (RF_signal) received by the antenna 207, demodulates it with a known despreading technique and outputs a demodulation signal (Demod_signal). A demodulation unit 210, supplied with the demodulation signal (Demod_signal) and separating various downlink physical channels by a known technique, retrieves data and control information from the physical channels. Specifically, the demodulation unit 210 retrieves E-DCH data receiving determination result (ACK/NACK) information from the base station out of the received E-HICH and outputs it to the MAC control unit 204. Also, out of the received E-AGCH/E-RGCH, scheduling result information (Sche_grant) from the base station is retrieved and outputs it to the MAC control unit 204. Also, from the DCH (or HS-DSCH (not shown) or FACH (not shown)) constituting a known downlink Release 5 channel set according to the communication setting, downlink receiving data is retrieved and outputted to a MAC receiving unit 211. In the case where control information (RRC_signalling: DCCH) including setting information (CH_config) is contained in the DCH channel data or the like inputted from the demodulation unit 210, the MAC receiving unit 211 retrieves and outputs it to the radio resource control unit 201. Also, in the case where the inputted DCH or the like contains data of a high-order protocol layer, the MAC receiving unit 211 outputs it as high-order data (DTCH) to the high-order protocol layer.

Figure 3:
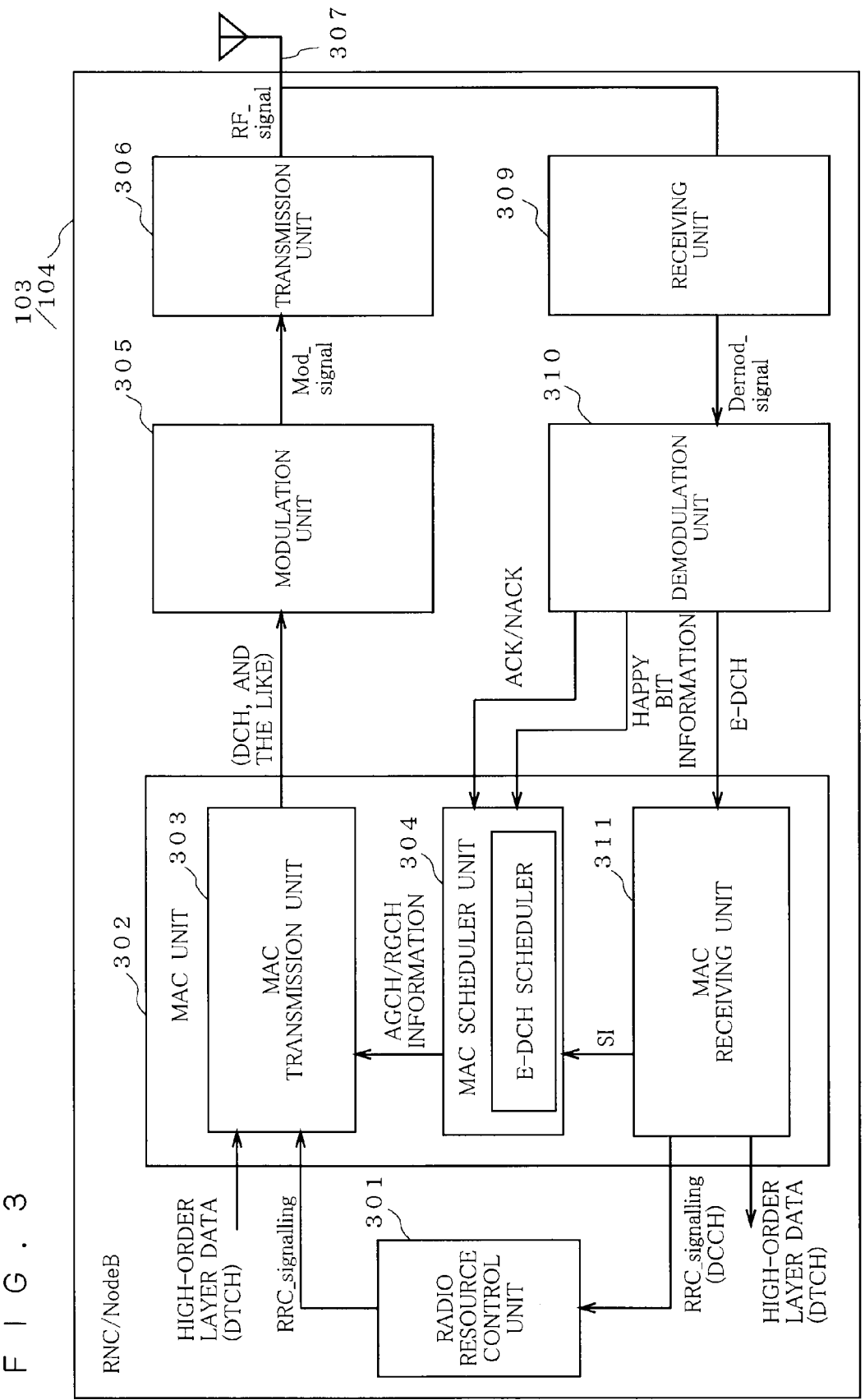
FIG. 3 is a block diagram showing a configuration of a fixed station (base station/base station control unit) according to the first embodiment of the present invention.

FIG. 3 is a block diagram showing the configuration of the fixed station (base station/base station control unit) according to the first embodiment of the present invention. With reference to FIG. 3, the internal structure (the function blocks and data and a control signal flow) of the fixed station is described below. In FIG. 3, the blocks having similar functions to those shown in the internal block diagram of the mobile station in FIG. 2 have similar names, respectively. The blocks of the fixed station including the base station 103 and the base station control unit 104 represent function units (entities), and exist in one of them or as an independent device according to the mode in which the base station 103 and the base station control unit 104 are implemented. According to 3GPP standard, the fixed station including both the base station control unit (RNC) and the base station (NodeB) is referred to as UTRAN (Universal Terrestrial Radio Access Network). The base station (NodeB), however, has an interface for physical communication directly with the mobile station (UE) and is defined as a radio interface (referred to as Uu in the W-CDMA standard).

A radio resource control unit 301 controls each part of the fixed station to control various setting including transmission speeds and combinations of channels required for the communication with the mobile station 102. Also, the radio resource control unit 301 is supplied with and outputs various setting information (CH_config). Part of the various types of setting information is exchanged (RRC signalling) between the fixed station (the base station control unit 104/the base station 103) and the mobile station 102 in an initial stage of or during the communication and stored in the radio resource control unit 301. The transmission information (RRC signalling) of the radio resource control unit to the mobile station is transmitted as data carried on a known channel, the HS-DSCH (HS-PDSCH as a physical channel, not shown), the DCH (DPDCH, not shown) or the FACH (PFACH, not shown) prior to Release 5. According to the present embodiment, for convenience' sake, the operation midway of communication is explained, and therefore, the transmission information is carried on the DCH. The present invention, however, is not limited to the present embodiment.

A MAC transmission unit 303 is supplied with transmission data (DTCH) from a high-order protocol layer and control information (DCCH) from the radio resource control unit 301 and outputs them as DCH data. Various setting is possible for the DTCH and DCCH data including, for example, transmission over channels DCH, HS-DSCH (not shown) or FACH (not shown) prior to Release 5. These combinations are specified in a written standard, and the present invention is not limited to the present embodiment.

A MAC scheduler unit 304 has therein an E-DCH scheduling function (described as E-DCH scheduler in the figure). The MAC scheduler unit 304 is supplied with the mobile station status information (SI and happy bit information) and the E-DCH data demodulation result (ACK/NACK) transmitted from the mobile station to conduct scheduling for E-DCH. The scheduling result is outputted to a MAC transmission unit 303 as AGCH/RGCH information. The AGCH/RGCH data is transmitted to the mobile station 102 through a modulation unit 305, a transmission unit 306 and an antenna 307 to be described later.

The modulation unit 305 multiplexes various data (DTCH, DCCH), the scheduling result information (AGCH/RGCH data), the physical control channel, and the like by a known technique such as so-called IQ multiplexing. Further, with a known technique, a spread spectrum modulation process is executed, and a modulation signal (Mod_signal) is outputted. The modulation unit 305 makes up a multiplex modulation means. The transmission unit 306, after converting the inputted modulation signal (Mod_signal) into a radio frequency signal by a known technique, amplifies it to a required transmission power level and outputs a radio signal (RF_signal). The radio signal (RF_signal) is transmitted wirelessly from the antenna 307. The transmission unit 306 and the antenna 307 described above make up a transmission means.

A receiving unit 309, supplied with a downlink radio signal (RF_signal) received by the antenna 307, demodulates it by a known despreading technique and outputs a demodulation signal (Demod_signal). A demodulation unit 310, supplied with the demodulation signal (Demod_signal), separates various downlink physical channels by a known technique and retrieves various data and various control information from the physical channels. Specifically, the demodulation unit 310 demodulates the E-DCH data from the demodulated E-DPDCH and outputs it to a MAC receiving unit 311. Also, the demodulation unit 310 outputs an E-DCH receiving determination result (ACK/NACK) to the MAC scheduler unit 304. Further, the demodulation unit 310 demodulates the happy bit information from the E-DPCCH and outputs it to the MAC scheduler unit 304. In the case where control information (RRC_signalling: DCCH) including various setting information (CH_config) is contained in the E-DCH inputted from the demodulation unit 310, the MAC receiving unit 311 retrieves and outputs the control information to the radio resource control unit 301. Also, in the case where the inputted E-DCH (or DCH or the like) contains data of a high-order protocol layer, the MAC receiving unit 311 outputs it as high-order layer data (DTCH) to the high-order protocol layer. The radio resource control unit 301, the MAC transmission unit 303, the MAC scheduler unit 304 and the MAC receiving unit 311 described above make up a transmission control means. Also, the MAC transmission unit 303, the MAC scheduler unit 304 and the MAC receiving unit 311 make up a part of a media access unit (MAC unit) 302.

FIG. 4 is a table showing an example of specifying headroom information of the transmission power of the mobile station to be transmitted to the base station as SI (Scheduling Information). In FIG. 4, index values constituting the SI signaling information to be actually notified is shown on the left side, and transmission power headroom values corresponding to each index value on the right side. In the table, the value of parameter X is notified to the radio resource control unit 201 of the mobile station as the setting information from the radio resource control unit 301 of the base station control unit 104 and transferred to the MAC control unit 204. Also, the specification in FIG. 4 includes a specification expression "X[dB] or more" for indicating the range of the maximum value or more. For the other values, an index value "1" in the table, for example, represents "1[dB]≦ a [dB] <2[dB]" indicating the value within the range.

FIG. 5 shows a flow for notifying (RRC_signalling) a set value of the parameter (X) in FIG. 4. In the figure, the arrows indicate starting and ending points, and although not indicating any relay point on the way, the notification is actually transmitted and received through the base station 103 making up a radio interface with the mobile station 102. First, the radio resource control unit 301 of the base station control unit 104 determines the set value of the parameter (X) and outputs it as the setting information (RRC_signalling: DCCH) to the MAC transmission unit 303. The setting information data inputted to the MAC transmission unit 303, as described with reference to FIG. 3, is wirelessly transmitted through the modulation unit 305, the transmission unit 306 and the antenna 307 (step 501). The mobile station, upon receipt of the setting information from the fixed station, transmits a response signal (or a setting completion signal) to the fixed station (step 502). The setting information from the base station control unit is received and demodulated by each block of the antenna 207, the receiving unit 209, the demodulation unit 210, and the radio resource control unit 201 and stored in the MAC control unit 204. The parameter thus stored is used as the specification of FIG. 4. Although FIGS. 4 and 5 show a case in which the X value is notified from the fixed station, the X value may alternatively be a fixed value.

As described above, a detailed specification of the total transmission power headroom of the mobile station is provided as SI, and the transmission power headroom value is notified to the fixed station (base station). Therefore, the operation in the communication system is unified and the efficiency of the uplink radio resource control operation in the fixed station is improved. Also, the provision of the specification "... or more" reduces the number of signaling bits from the mobile station to the fixed station is reduced. Further, since the X value is designated by the fixed station, the radio resource control operation such as uplink scheduling at the fixed station can be made flexible.

FIG. 6 shows an example of the case in which the X value is provided as a fixed value in the written standard according to a modification of the specification shown in FIG. 4. In FIG. 6, a fixed value 21 is provided as the X value. This is determined from the maximum value of the ratio of the E-DPDCH channel transmission power to the DPDCH channel transmission power (i.e. the power offset amount described as ΔE-DPDCH in FIG. 7) or the maximum value of the channel amplitude (gain factor) corresponding to the power offset. This is described below with reference to FIG. 7. In the table shown in FIG. 7, the left column indicates "notification indices" (Signalling values for ΔE-DPDCH) and the right column "setting specification of the quantized E-DPDCH channel amplitude coefficient" (Quantized amplitude ratios). FIG. 7 shows power offset amounts (ΔE-DPDCH) provided in a known written standard, the setting specification of the quantized E-DPDCH channel amplitude coefficient (βed) provided from the values of the power offset amounts and the value to be notified (index: signalling value). The maximum power offset (=21) of E-DPDCH is calculated as shown below from the maximum value (168/15) in the table.

$$\Delta E - DPDCH = 20 \times \text{Log}_{10}[(168/15) \div 10] = 20.98 \cong 21 \quad \text{[Equation 1]}$$

As described above, the maximum ratio of the E-DPDCH channel power is 21 dB. Specifically, even in the case where the transmission power of the mobile station has a margin of 21 dB or more which is the maxim ratio of the E-DPDCH channel power determined as above, it has no meaning to the scheduling of the base station, and therefore, is not required to be transmitted as the notification information. In this way, the X value is provided as the maximum amount of the E-DPDCH channel transmission power ratio, and therefore, the number of bits required for the notification (signalling) to the base station from the mobile station is advantageously reduced. Although the modification described above uses 21 as an ideal maximum change amount, a value taking the deviation specification of the transmission power of the mobile station into consideration (e.g., 20 or 22) may be employed. Also, in the case where the E-DPDCH channel amplitude specification is changed during communication, that value may be used. Further, a value with a margin of 27 dB or 29 dB, for example, may be set reflecting the number of E-DPDCHs that can be transmitted at the same time or the offset amount of gain factor due to the difference in the diffusion coefficient (SF). As described above, according to the modification of the present embodiment, the X value is provided as a standard, and therefore, the number of signaling bits from the mobile station to the fixed station can be further reduced.

Embodiment 2

FIG. 8 is a table showing an example of specifying headroom information of transmission power of the mobile station to be transmitted to the base station as SI (Scheduling Information) according to a second embodiment of the present invention. In FIG. 8, no range is designated other than "more than 21 [dB]". The MAC control unit 204 of the mobile station 102 executes preprocessing at the time of selecting a value in the table quantized from the transmission power information transmitted by the transmission power measurement control unit 208 and, by selecting a specified value, transmits the corresponding value (signalling value) to the base station 103. Various preprocessing methods are available including (1) selecting a value rounded up, (2) selecting a value rounded down, (3) selecting a value rounded off, and (4) selecting a value rounded up or rounded down according to the direction in which the transmission power headroom is increased or decreased. Among them, one method is provided in accordance with the written standard or the implementation of the mobile station. The method of (1), (2) or (3) may be selected by the fixed station and notified to the radio control unit 201 to designate the operation of the mobile station.

As described above, the detailed specification of the total transmission power headroom of the mobile station is provided as SI and notified from the mobile station to the base station. Therefore, the operation of the mobile stations in the communication system is unified and the efficiency of the uplink radio resource control operation at the fixed station is improved. Also, the radio resource control operation such as the uplink scheduling at the fixed station can be made flexible by designating the preprocessing method at the fixed station.

Embodiment 3

A third embodiment of the present invention is described below with reference to FIG. 9. According to the present embodiment, the specification "X [dB] or more" is provided depending on the communication speed. According to the W-CDMA, a total mass (E-TFCS:E-TFC Set) of data communication speed setting (referred to as E-TFC in 3GPP) required for the communication service is set between the radio resource control unit 201 of the mobile station and the radio resource control unit 301 of the fixed station in an initial stage of or during the communication. As to the E-TFCS, all the mass elements are notified or the whole is completed by the mobile station from part of the setting (referred to as Reference E-TFC in 3GPP) information. Once a minimum speed (E-TFC, min) and a maximum speed (E-TFC, max) provided in the E-TFCS are set, the corresponding E-DPDCH channel amplitude (gain factor) and the transmission channel power are determined, and therefore, the change width of the E-DPDCH transmission power can be determined. As described in the modification of the first embodiment, therefore, even in the case where the transmission power of the mobile station has a larger margin, it is meaningless for the scheduling at the base station and not required to be transmitted as information. In this way, by providing the X value by the maximum value of the E-DPDCH channel transmission power ratio set in actual communication, the number of bits required for the notification (signalling) from the mobile station to the fixed station is reduced. In the case where the E-DPDCH channel amplitude specification shown in FIG. 7 is changed, it indicates not less than the maximum value. Since E-TFCS is changed, as shown in the table of the SI specification in FIG. 9, an exclusive specification column is prepared for providing a specification (or interpretation of the specification) "not less than the maximum power ratio [dB] (of the maximum E-DPDCH channel provided from E-TFCS)" but not the specification (or the interpretation of the specification) "X [dB] or more". Not the whole E-TFCS but several standard E-TFC (Reference E-TFC) may be notified to the mobile station. In such a case, the maximum power difference may be determined from the standard E-TFC.

As a modification of the present embodiment, a case is described below in which the maximum speed setting is E-TFC having a specified attribute at a certain point in time of transmission of the mobile station. As described in Non-Patent Document 1, the status is provided by each E-TFC in E-TFCS. The status is of two types including (1) usable (supported) and (2) not usable (blocked). In the case where the usable (supported) state or the unusable (blocked) state can be determined by an arithmetic means of the total transmission power headroom in at least one specific transmission timing section (TTI, slot, frame, and the like), the transition between states is a quasi-static operation, and therefore, may be adapted to indicate a value not less than the power difference corresponding to the difference between maximum and minimum speeds of E-TFC in usable (supported) state. As described above, a detailed specification about the total transmission power headroom of the mobile station is provided as SI and notified from the mobile station to the base station. Therefore, the operation of the mobile stations in the communication system is unified and the efficiency of the uplink radio resource control operation in the fixed station is improved.

As a second modification of the third embodiment described above, the situation of the transmission power headroom at about the point in time of the SI transmission may be reflected in such a manner that the exclusive specification column may be adapted to indicate not less than the power difference between the E-DPDCH channel transmission power corresponding to E-TFC used for the E-DCH data transmission immediately before the SI transmission point (or the E-DPDCH channel transmission power actually used) and the E-DPDCH channel transmission power corresponding to the maximum speed (E-TFC, max).

Embodiment 4

A fourth embodiment of the present invention is described below with reference to FIG. 10. According to the present embodiment, the interpretation of the specification "X [dB] or more" is provided to mean "out of the measurement (estimation) range of the total transmission power of the mobile station". As an expression in the standard, however, the specification may be described as "out of the range" instead of "X

[dB] or more". The transmission power measurement control unit 208 of the mobile station is supplied with the radio signal (RF_signal) from the transmission unit 206 to measure (or estimate) the transmission power. In a known radio signal measurement technique, for example, a method is used in which the envelope of a radio signal is detected using a diode and smoothed by a capacitor. In such a case, the normal mobile unit implementation is designed in such a manner as to include a measurement range from "the value of the maximum total transmission power setting (Pmax) as capability of the mobile station" to "Pmax less the maximum change of the total transmission power". This is by reason of the fact that in the case where the maximum power change occurs from the total transmission power out of the small range of the transmission power, for example, the power cannot be controlled in such a manner as to limit the total transmission power of the mobile station to the maximum total transmission power setting (Pmax) level. In other words, the SI transmission to the base station indicates that the total transmission power of the mobile station is out of the measurement range. As described above, a detailed specification of the total transmission power headroom of the mobile station is provided as SI and notified from the mobile station to the base station. Therefore, the operation of the mobile stations in the communication system is unified, and the efficiency of the control operation of the uplink radio resources in the fixed station is effectively improved. Also, since the information in the immeasurable range is not notified as the transmission power headroom information, the number of bits indicating the value (signalling value) for the notification as SI is reduced.

According to the present embodiment, the information on the capability of the mobile station (UE capability) may be notified to the radio resource control unit 301 (or the MAC scheduler unit 304 of the base station through the radio resource control unit 301) of the fixed station by exchange of the setting information (RRC_signalling) in an initial stage of the communication. As a result, the notification is reflected in the uplink scheduling result at the fixed station and the radio resources are not assigned wastefully, thereby further improving the efficiency of the communication system. In the case where the assignment of the radio resources is limited at the fixed station, on the other hand, the value specifying "out of the range" may be notified to the mobile station. As a result, a flexible communication system can be constructed regardless of a specific equipment manufacturer of the fixed station.

Embodiment 5

FIG. 11 is a table showing an example of specifying headroom information of transmission power of the mobile station, transmitted to the base station as SI (Scheduling Information). According to the fifth embodiment, the headroom information is determined from the minimum value (or the corresponding channel amplitude (gain factor)) in the specification of the power offset amount (ΔE-DPDCH) of the E-DPDCH channel transmission power from the DPCCH transmission power as shown in FIG. 7. Referring to FIG. 7 shown for describing the first embodiment, the minimum power offset of E-DPDCH is calculated as shown below from the minimum value (5/15) in the table.

$$\Delta E - DPDCH = 20 \times \text{Log}_{10}[(5/15) \div 10] = -9.5 \cong -10 \quad \text{[Equation 2]}$$

In the case where the transmission power headroom of the mobile station is not more than the value described above, the information is meaningless for scheduling of the base station and not required to be transmitted. Also, in the case where the transmission power headroom is smaller than the minimum value of the quantized channel amplitude (gain factor) according to a known standard, on the other hand, the specification is provided to set E-DPDCH to non-transmission (DTX; equivalent to zero in gain factor). In this way, by specifying the SI notification range using the E-DPDCH channel transmission power offset (minimum) value, the number of bits required for notification from the mobile station to the base station is effectively reduced. Although a fixed value is provided as a minimum value according to the aforementioned embodiment, it may alternatively be set by notification from the fixed station. As a result, efficient scheduling is made possible by the fixed station. Also, in the case where the E-DPDCH channel amplitude specification is changed, the minimum value of the changed value may be used. Further, a specific limit value such as −11 may be set taking an estimation error of the total transmission power headroom into consideration. In view of the fact that a detailed specification of the total transmission power headroom of the mobile station is provided as SI and notified from the mobile station to the fixed station as described above, the operation of the mobile stations in the communication system is unified and the efficiency of the control operation for the uplink radio resources in the fixed station is improved. The specification or the interpretation ". . . [dB] or less", "less than . . . [dB]" or "out of the range" meaning "out of the range" may be provided as in the first embodiment. Also, instead of fixing the transmission power headroom at equal intervals (steps), such measures may be taken as (1) setting at unequal intervals, (2) setting a plurality of dB steps, (3) notifying a step value from the fixed station, (4) setting by calculation in the mobile station, or the like. Further, the specification may assume a value with a margin such as −11 dB.

Embodiment 6

FIG. 12 is a table showing an example of specifying the headroom information of the transmission power of the mobile station, transmitted to the base station as SI (Scheduling Information) according to a sixth embodiment of the present invention. In FIG. 12, the column to the extreme left represents the value (SI signalling value) actually notified to the base station as SI and the next right column the corresponding transmission power headroom value (expressed by dB). The right half column is identical with the table of the E-DPDCH channel amplitude (i.e. the gain factor (βed)) and the signalling value thereof shown in FIG. 7 according to the first embodiment. The quantized transmission power headroom (expressed by dB) value is determined by calculating the ΔE-DPDCH power offset value (expressed by dB) back from the value of the E-DPDCH channel amplitude in the extreme right column. The quantization steps are also set at the same intervals. By using the value of the quantized transmission power headroom (expressed by dB) identical with the power offset (ΔE-DPDCH) value of the E-DPDCH channel power, the need of specifying the value of the transmission power headroom for SI notification is eliminated, and therefore, the size of the storage unit of the mobile station can be reduced. Also, according to the present embodiment, the same SI value is used for notification (signalling value) to the base station and the signalling value for the gain factor. By doing so, no value for SI notification is specifically required to be provided as in the aforementioned case, and the size of the storage unit of the mobile station can be reduced. Although the "unused" (reserved) column is provided in FIG. 12, it may be combined with the specification such as ". . . [dB] or more" or "out of range" as in the first to fourth embodiments described above. Also, as in the fifth embodiment, it may be combined with the specification meaning ". . . [dB] or less (or less than . . . [dB])".

Further, although the present embodiment represents a case in which all the values of the steps of the quantized power offset ΔE-DPDCH are used, they can also be prepared separately. As a modification of the present embodiment, the transmission power headroom value can also be specified in rough steps as compared with ΔE-DPDCH. In such a case, by preparing a table in the form partially extracted from the values in the table of FIG. 12, the bit (or the flag) indicating a particular value of ΔE-DPDCH used (○ or ×) is simply set in correspondence with the value. Therefore, the storage area is less increased. In this case, the SI value (signalling value) notified to the base station is not 0 to 29, for example, but the steps in the number of $2^4-1$ are extracted and set in correspondence with 0 to $2^4-1$ thereby to reduce the number of bits required. Further, the number $2^5-1$ may be specified by adding the provision reflecting the number of the E-DPDCH simultaneous transmission channels or the diffusion coefficient. As described above, a detailed provision of the total transmission power headroom of the mobile station is provided as SI and notified from the mobile station to the base station. Therefore, the operation of the mobile stations in the communication system is unified and the efficiency of the control operation of the uplink radio resources in the fixed station is improved.

Embodiment 7

FIG. 13 is a table showing an example of specifying the headroom information of the transmission power of the mobile station, transmitted to the base station as SI (Scheduling Information). According to the present embodiment, an integer near to the value of the transmission power headroom shown in FIG. 12 according to the aforementioned embodiment is used for expression of the transmission power headroom value. Since a numerical value as high in accuracy as in FIG. 12 is not used, the number of bits for storing the SI provision in the mobile station is reduced. According to the present embodiment, the expression such as ". . . [dB] or more" is not specifically used for the display in the table specifying the transmission power headroom. In this case, only the interpretation of the specification (21 dB in FIG. 13) of the maximum value may be described in a separate written standard to interpret not less than that value (i.e. to interpret as "21 [dB] or more"). In similar fashion, the provision indicating ". . . [dB] or less" shown in the fifth embodiment may be specified. Further, as in the modification of the sixth embodiment described above, the interval between the steps of the SI specification may be reduced. In this way, as long as effective, the methods of specification according to the first to fifth embodiments may be combined. As described above, a detailed specification is provided as SI for the total transmission power headroom of the mobile stations and notified from the mobile station to the base station. Therefore, the operation of the mobile stations in the communication system are unified, and the efficiency of the control operation of the uplink radio resources at the fixed station is improved.

Embodiment 8

According to the eighth embodiment of the present invention, as a specified value or step of the headroom quantity of the transmission power of the mobile station, transmitted to the base station as SI (Scheduling Information), the same one as the scheduling result information (the specification of the power offset provided from E-AGCH or E-RGCH) notified from the base station 102 or the specification of the power offset amount (Serving Grant) in the mobile station reflecting the scheduling result information is used. This is by reason of the fact that in the case of E-AGCH, like the value of the transmission power headroom, the notification is made in the form of the power offset amount of the E-DPDCH channel power from the DPCCH channel power, and E-RGCH or the offset amount in the mobile station specifies the power offset amount usable by the mobile station. According to the latest current standard, the AGCH specification (value and step) is not yet determined, and may employ (1) the same specification as, (2) the specification extracted from or (3) the specification including the one according to the first to seventh embodiments described above. The provision similar to the specification of the E-AGCH or E-RGCH or the offset amount in the mobile station eliminates the need of securing a specific storage area to specify the transmission power headroom for the same specified amount. Thus, the storage area of the mobile station is further reduced and the configuration of the mobile station is not complicated. As described above, a detailed specification of the total transmission power headroom of the mobile station is provided as SI and notified from the mobile station to the base station. Thus, the operation of the mobile stations in the communication system are unified, and the efficiency of the control operation of the uplink radio resources in the fixed station is improved. The specification of E-AGCH and E-RGCH have different purposes, and therefore, not necessarily have the same specification as the SI power headroom, but (1) may be partly identical or (2) one of them may include the other.

Embodiment 9

FIG. 14 is a table showing an example of specifying the headroom information of the transmission power of the mobile station transmitted to the base station as SI (Scheduling Information). The table according to the present embodiment represents an example providing that the maximum E-TFC information available for use with the headroom quantity of the transmission power of the mobile station is notified to the base station. In setting E-TFCS in the initial stage of the communication or changing (Reconfiguring) E-TFCS during the communication, the MAC control unit 204 of the mobile station calculates the power offset of the E-DPDCH channel at the time of transmission in each E-TFC from the E-TFCS information and stores it in the MAC control unit 204. As described in the first embodiment, the MAC control unit 204 has the function of selecting one E-TFC based on the transmission power headroom quantity before E-DCH data transmission. The utilization of this function eliminates the need of the processing function for specific SI notification and thereby advantageously simplifies the configuration of the mobile station. As described above, a detailed specification is provided about the total transmission power headroom of the mobile station as SI and notified from the mobile station to the base station. Therefore, the operation of the mobile stations in the communication system is unified, and the efficiency of the control operation of the uplink radio resources in the fixed station is improved.

In the case where a plurality of E-TFC is available for the same or about the same transmission power headroom in each specification shown in FIG. 14, the E-TFC associated with the channel (DTCH or DCCH) of the high-order layer having the highest priority order of transmission may be used. Also, in the case where the communication quality (QoS) required of each high-order layer channel or the combination thereof is different with respect to the priority order of the high-order layer channel, an additional channel power offset amount set from the QoS may be specified in addition to the power offset amount determined from the communication speed (E-TFC). By taking this additional power offset (referred to as the power offset attribute parameter of HARQ profile in Non-Patent Document 1) into consideration, the E-TFC notified as SI may be selected. As a result, the radio resource control reflecting the transmission data QoS is made possible for a further improved efficiency of the control operation of the radio resources.

Embodiment 10

A tenth embodiment specifies a manner in which the transmission power headroom situation of the mobile station is reflected in criteria of setting of the happy bit. In the Non-Patent Document 1 described in the section of Background Art, the criteria (happy or unhappy) of the happy bit are set in such a manner that the situation is determined as "unhappy" and the corresponding information notified to the base station only in the case where two conditions are satisfied, i.e. (1) the transmission power has such a margin as to permit the transmission with E-TFC higher in communication speed (E-TFC) than actually used for the E-DCH data transmission, and (2) the data amount requiring the transmission time not less than a certain set value is stored in the transmission buffer. According to the present embodiment, the condition (1) for determining as "unhappy" is changed so that the situation is determined as "unhappy" in the case where the transmission power has such a margin that transmission is possible with E-TFC larger than the maximum transmission speed (E-TFC, max). The scheduler of the base station is not required to consider the transmission power offset more than the maximum setting of E-TFC set (configured) in the initial stage of or during the communication, and therefore, the additional information is meaningless. The happy bit determination according to the present embodiment based on whether the transmission power headroom is more than that required for the maximum transmission speed (E-TFC, max) makes it possible to supply the transmission power corresponding to the unrequired transmission power headroom to other mobile stations, and therefore, the communication system can be used efficiently. As described above, a detailed specification of the total transmission power headroom of the mobile station is provided as SI and notified from the mobile stations to the base station. Thus, the operation of the mobile stations in the communication system are unified and the efficiency of the uplink control of the radio resources in the fixed station is improved. The specification of the happy bit information according to the present embodiment may be combined with the SI specification according to the first to ninth embodiments described above. By doing so, the communication system can be used more efficiently.

Embodiment 11

The 11th embodiment of the present invention represents a manner in which the transmission power headroom situation of the mobile stations is specified in the happy bit setting standard. According to the present embodiment, the condition (1) for the conventional "unhappy" determination method described above in the tenth embodiment is changed in such a manner that the situation is determined as "unhappy" in the case where the transmission power has a margin for a certain set value ("Y [dB] or more"). This set value may be notified (RRC_signalling) from the radio resource control unit 301 of the fixed station or specified as a new version of the written standard by amendment thereof. The method of notification from the fixed station to the mobile stations is similar to that shown in the flow of FIG. 5 according to the first embodiment. Since the set value is notified from the fixed station, a threshold value for determining an optimum "unhappy" bit can be set taking the whole communication system into consideration by the fixed station, and therefore, the flexible control of the communication system is made possible. As described above, a detailed specification of the total transmission power headroom of the mobile stations is provided as SI and notified from the mobile stations to the base station. Thus, the operation of the mobile stations of the communication system is unified, and the efficiency of the uplink control operation of the radio resources in the fixed station are improved. The specification of the happy bit information according to the present embodiment can be combined with the SI specification according to the first to ninth embodiments described above. By doing so, the communication system can be used more efficiently.

Embodiment 12

FIG. 15 is a table showing an example of specifying the headroom information of the transmission power of the mobile station transmitted to the base station as SI (Scheduling Information). According to this twelfth embodiment, the specification of the power offset amount is defined using a square of the specified gain factor value of E-DPDCH shown in FIG. 7. Also, up to a maximum of four E-DPDCH channels (i.e. diffusion codes) transmissible at a time can be set in E-DCH, and in order to specify the transmission in this code multiplexing operation, the power offset value shown in the sixth embodiment is expanded. In the case where the power offset value is expanded in this way, an index of 0 to $2^4-1$ (or $2^5-1$) is not expressed by use of four bits (or five bits) as shown in the aforementioned embodiments, but the specification is provided using, for example, six bits, or the like. As described above, a detailed specification of the total transmission power headroom of the mobile station is provided as SI and notified from the mobile station to the base station. Thus, the operation of the mobile stations in the communication system is unified, and the efficiency of the uplink control operation of the radio resources in the fixed station is improved.

Also, the SI and the specification are provided from the gain factor specification and the setting of the number of E-DPDCH simultaneous transmission channels specified according to the standard. Therefore, a storage area for SI specification is not specifically required to be secured and the configuration of the mobile station is not complicated. According to the present embodiment, the expression ". . . or more" is not specifically used for indication in the table of the specification of the transmission power headroom. In this case, the written standard may contain a specific description that only the specification $(168/15)^2*6$ in FIG. 15) of the maximum value is interpreted to be equal to or more than that value. In a similar fashion, the specification indicating ". . . or less" as shown in the fifth embodiment may be provided. Further, in order to save the radio resources for signalling by limiting the number of bits for the index to four or five, either (1) the interval of the steps of the SI specification may be reduced as in the modification of the sixth embodiment described above, or (2) the smaller one of the power headrooms, for example, may be partially extracted. In this way, the effect of each embodiment is produced by combining each embodiment.

Also, according to the present embodiment, the maximum specification is provided using the maximum number (=4) of the E-DPDCH channels transmissible at the same time and the maximum E-DPDCH gain factor (=168/15). As an alternative, a specification using another gain factor (for example, $(150/15)^2*4$) may be provided (1) for a sufficiently large power headroom value (for example, $(168/15)^2*5$) or (2) a sufficiently large number of E-DPDCH channels. Further, for convenience' sake, the value expressed by dB corresponding to the true value described above may be added to the written standard.

Also, the SI and the specification are provided from the gain factor specification and the setting of the number of E-DPDCH simultaneous transmission channels specified according to the standard. Therefore, a storage area for SI specification is not specifically required to be secured and the configuration of the mobile station is not complicated. According to the present embodiment, the expression " . . . or more" is not specifically used for indication in the table of the specification of the transmission power headroom. In this case, the written standard may contain a specific description that only the specification ($(168/15)2*6$ in FIG. 15) of the maximum value is interpreted to be equal to or more than that value. In a similar fashion, the specification indicating " . . . or less" as shown in the fifth embodiment may be provided. Further, in order to save the radio resources for signalling by limiting the number of bits for the index to four or five, either (2) the interval of the steps of the SI specification may be reduced as in the modification of the sixth embodiment described above, or (2) the smaller one of the power headrooms, for example, may be partially extracted. In this way, the effect of each embodiment is produced by combining each embodiment.

Also, according to the present embodiment, the maximum specification is provided using the maximum number (=4) of the E-DPDCH channels transmissible at the same time and the maximum E-DPDCH gain factor (=168/15). As an alternative, a specification using another gain factor (for example, $(150/15)2*4$) may be provided (1) for a sufficiently large power headroom value (for example, $(168/15)2*5$) or (2) a sufficiently large number of E-DPDCH channels. Further, for convenience' sake, the value expressed by dB corresponding to the true value described above may be added to the written standard.

Although only the frequency multiplexing (FDD) method is described in each embodiment of the present invention, a similar effect can be produced also by the time multiplexing (TDD) or the combination of the frequency multiplexing (FDD) and the time multiplexing (TDD), and the present invention is not limited to the aforementioned embodiments.

INDUSTRIAL APPLICABILITY

The present invention is applicable to a mobile communication terminal device as a whole including a cellular telephone operated in a radio communication system based on 3GPP standard.

The invention claimed is:

1. A communication method comprising:
   sending, from a mobile station to a base station, mobile station transmission power headroom information reflecting headroom quantity of transmission power in the mobile station;
   indicating uplink radio resources from said base station to said mobile station on a basis of said mobile transmission power headroom information; and
   sending data from said mobile station to said base station according to said indication of said uplink radio resources by said base station,
   wherein a selected one of a first signaling value reflecting that headroom quantity of mobile station transmission power is contained within a first range having a predetermined first lower limit quantity and a predetermined upper limit quantity, and a second signaling value reflecting that headroom quantity of said mobile station transmission power is contained within a second range having a predetermined second lower limit quantity, is sent as said mobile station transmission power headroom information in the step of sending said mobile station transmission power headroom information.

2. The communication method of claim 1, wherein said second lower limit quantity is equal to or greater than said upper limit quantity.

* * * * *